United States Patent Office 2,824,123
Patented Feb. 18, 1958

2,824,123

SEPARATION OF DICARBOXYLIC ACIDS

Vincent P. Kuceski, Park Forest, Ill., assignor to The C. P. Hall Company of Illinois, Chicago, Ill., a corporation of Ohio Application February 17, 1956, Serial No. 566,173

8 Claims. (Cl. 260—485)

This invention relates to the separation of mixtures of straight-chain dicarboxylic acids with chain lengths of 2 to 10 carbon atoms, which mixtures contain at least two adjacent homologs.

In the synthesis of dicarboxylic acids, as by the oxidation of any of numerous starting materials, e. g., the fatty acids from red oil, tall oil, tallow fats, cottonseed and soybean foots, and other naturally occurring fatty acids and mixtures thereof; residues from the Oxo process and Fischer-Tropsch process; cyclic compounds such as cyclohexane, cyclohexanol and cyclohexanone; paraffins and olefins, mixtures of adjacent straight-chain dicarboxylic acid homologs are obtained, particularly if the starting material contains at least five carbon atoms in a straight chain. These mixtures cannot be separated by distillation without expensive distillation equipment because of association of the free carboxyl groups of the adjacent homologs. Furthermore, separation by distillation is objectionable because the boiling points of the acids are so high that they may decompose and discolor when distilled. Some form anhydrides on heating and this interferes with their separation on distillation; others form polymeric materials. If crystallization from solution is attempted, recycling of the mother liquor is difficult because of the accumulation of impurities in it.

According to this invention the acids are first esterified to dialkyl esters of a lower molecular weight alcohol, preferably to the dimethyl esters. The esters are then separated by a combined process of distillation in which shoulder fractions are collected, followed by crystallization of these fractions, the two steps of distillation and crystallization neatly complementing one another to give a high yield of products of high purity. These shoulder fractions are fractions collected between the distillate fractions if distillate fractions are collected, and if no distillate fractions are collected, they are fractions collected between the boiling points of adjacent homologs. These fractions may be the whole of such fractions, or only a part (for reasons which will be evident from what follows), as for example where the material distilling over between the boiling points of dimethyl suberate and dimethyl azelate is collected in two fractions substantially equal in volume and in one of which dimethyl suberate predominates and in the other of which dimethyl azelate predominates.

With expensive equipment a high percentage of distillate may be collected as pure fractions, but this is unnecessary, because all that is required is the collection of fractions which are composed essentially of esters of no more than two acids. One of the two components of each such binary mixture is then separated by crystallization.

The dimethyl esters are preferred for the separation because they solidify at temperatures appreciably higher than the esters of the longer chain alcohols. The melting points of esters of the adjacent acids are quite widely separated (except for the suberate and azelate) and the melting point of the eutectic mixture of any two adjacent esters is appreciably below the melting points of the respective esters. Also, except for the eutectic mixture of the suberate and the azelate, the respective eutectic mixtures contain only a small percent of the lower melting component. Therefore, on cooling the fractions represented by the shoulders (fractions which contain relatively high percentages of both components), high yields of the respective higher melting components are obtained in a state of high purity. By combining these crystalline fractions of the respective esters with any constant boiling distillate fractions of the same esters, good yields of very pure esters are obtained.

It is not commercially feasible to apply the process to the separation of widely separated homologs such as the oxalate and sebacate, or even the succinate and the suberate. Likewise, it is not usually commercially feasible to use the process for the separation of a mixture containing only two acids. The process finds its greatest usefulness in the treatment of a mixture of 3 or more acids from which a binary mixture is separated by distillation, and preferably in the treatment of two or more binary mixtures of esters obtained from the original acid mixture with separation of one of the components from each such mixture by crystallization. The invention finds particular applicability to the separation of mixtures of acids produced from oxidation syntheses which may yield as many as 5 or 6 or more adjacent straight-chain dicarboxylic acid homologs each of which contains 2 to 10 carbon atoms.

Although usually it will be advantageous to crystallize the distillate fractions without adding solvent, solvents may be used to advantage, as illustrated by certain of the examples included herein. Solvents may be used advantageously under various circumstances. Under proper conditions, they may improve the formation and growth of ester crystals and give a better separation. Also, they may improve the mobility and lower the viscosity of solutions so that crystallization takes place faster at lower temperatures. Thus, solvents may be used to obtain more efficient crystallization, as well as to perform the usual function of washing a crystallized mass to remove adhering mother liquor. The term "liquid systems" is used herein to refer to both binary systems containing no solvents, and the same to which solvent has been added for the recovery of an ester of high purity, as contemplated herein.

The boiling points of the adjacent dimethyl or other lower ester homologs are relatively close together, so that if one were to separate them into pure fractions by distillation on a commercial scale a still of a very large number of plates would be required to obtain fractions of high purity. If an efficient distillation tower is used in the combined operation of fractional distillation and fractional crystallization as herein disclosed, the rate of distillation may be increased many fold because only a minimum reflux ratio is necessary. In a relatively inefficient distillation tower as for example an ordinary steel distillation tower, the plateaus of the distillation curve may be relatively short. If no pure distillate is recovered, the distillate fraction collected between each two points of the curve which separate the original mixture of esters into binary mixtures, is subjected to fractional crystallization.

The invention will be further described in connection with the accompanying drawings, in which—

Figure 1:
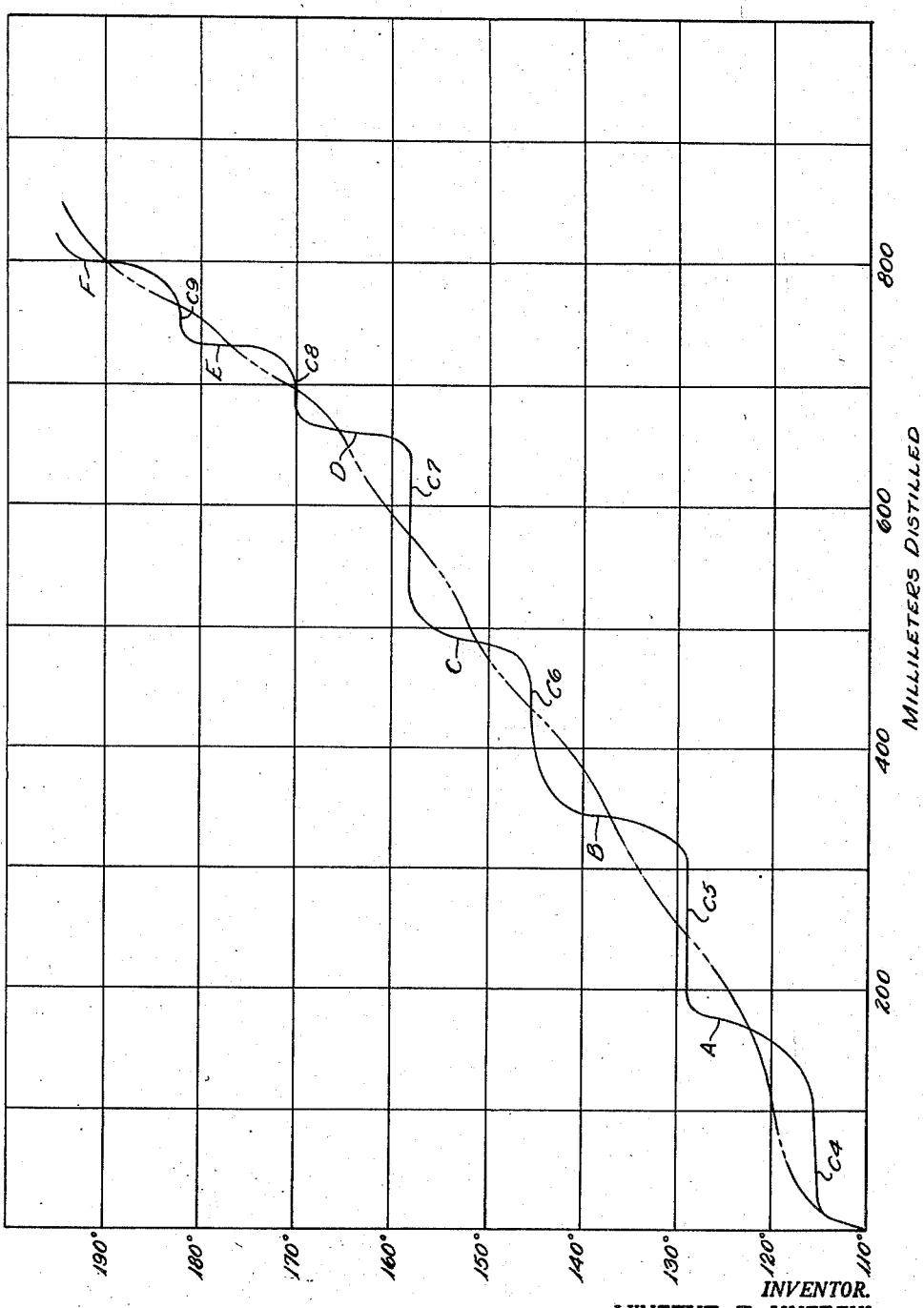
Fig. 1 shows the distillation curve of a mixture of dimethyl esters from succinic acid through azelaic acid.

For convenience, the various straight-chain dicarboxylic acids are identified in the drawings by their respective carbon contents, as explained in the following table which includes the whole series from oxalic acid to sebacic acid:

$C_2$ is oxalic acid  
$C_3$ is malonic acid  
$C_4$ is succinic acid  
$C_5$ is glutaric acid  
$C_6$ is adipic acid  
$C_7$ is pimelic acid  
$C_8$ is suberic acid  
$C_9$ is azelaic acid  
$C_{10}$ is sebacic acid In discussing the curves, the term "solidification point" will be used to refer to the temperature at which a liquid crystallizes. It is somewhat lower than the melting point, the two usually forming approximately parallel curves.

Figure 2:
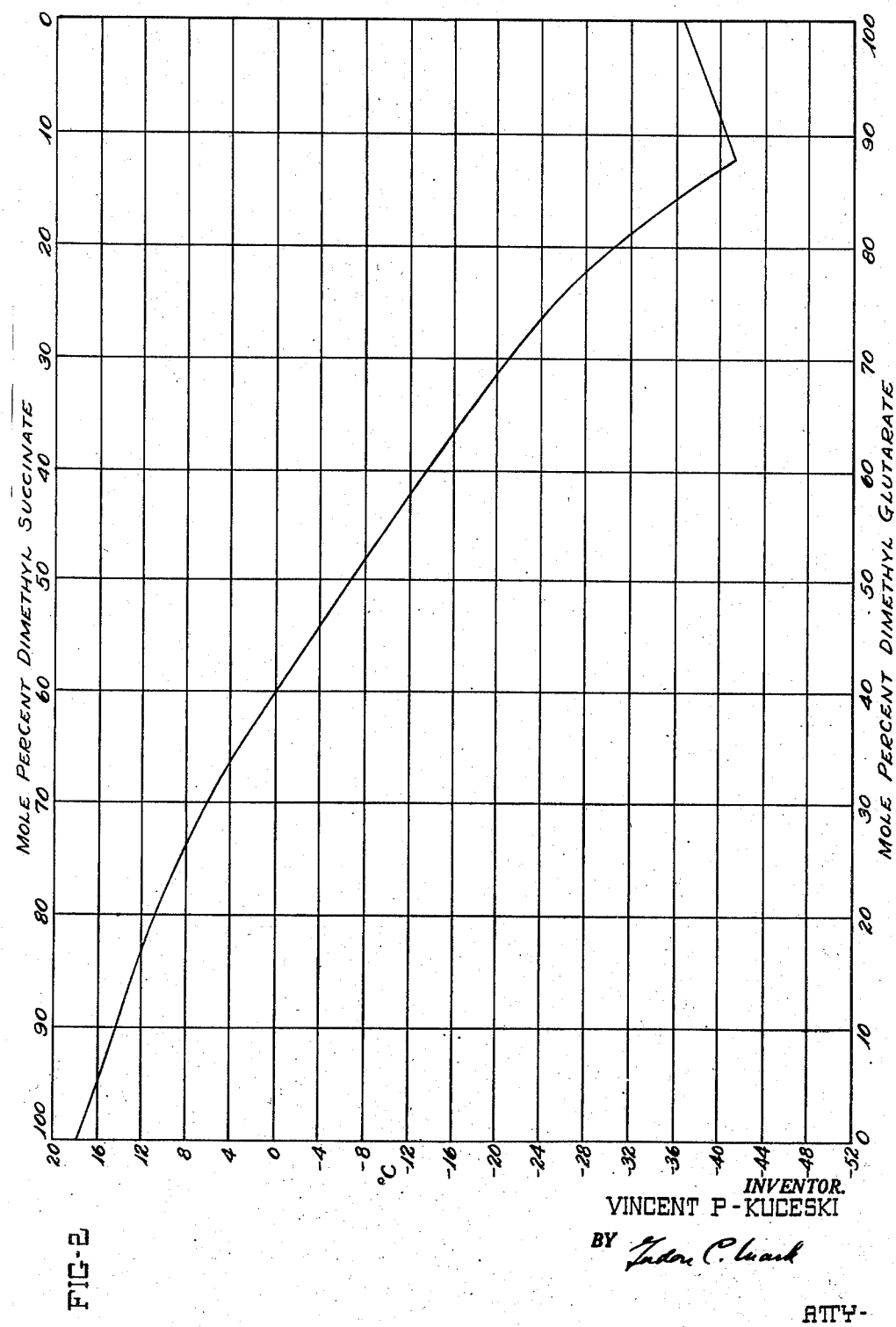
Fig. 2 is a curve of the solidification points of binary mixtures of dimethyl glutarate and dimethyl succinate.
Figure 3:
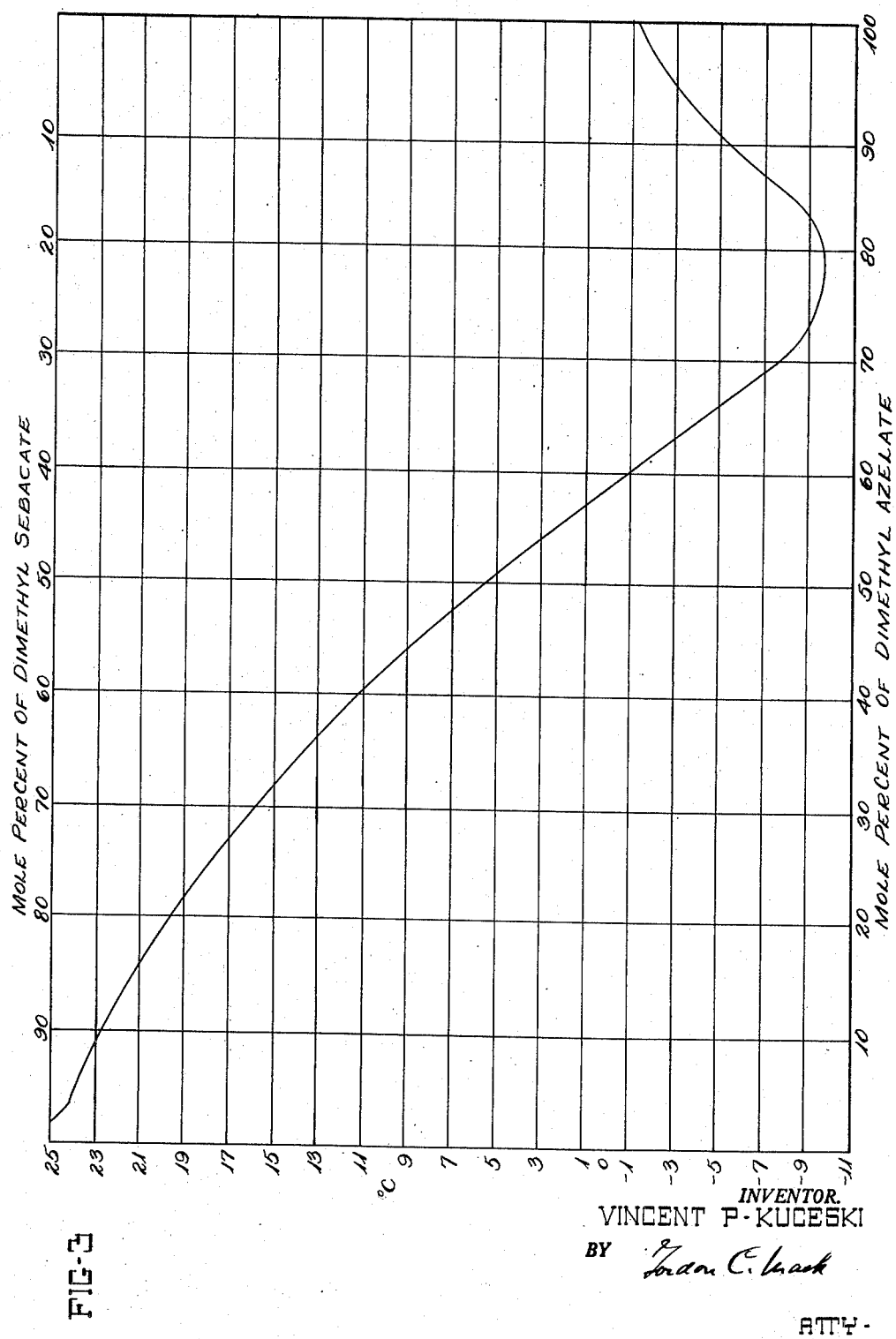
Fig. 3 is a curve of the solidification points of binary mixtures of dimethyl azelate and dimethyl sebacate.
Figure 4:
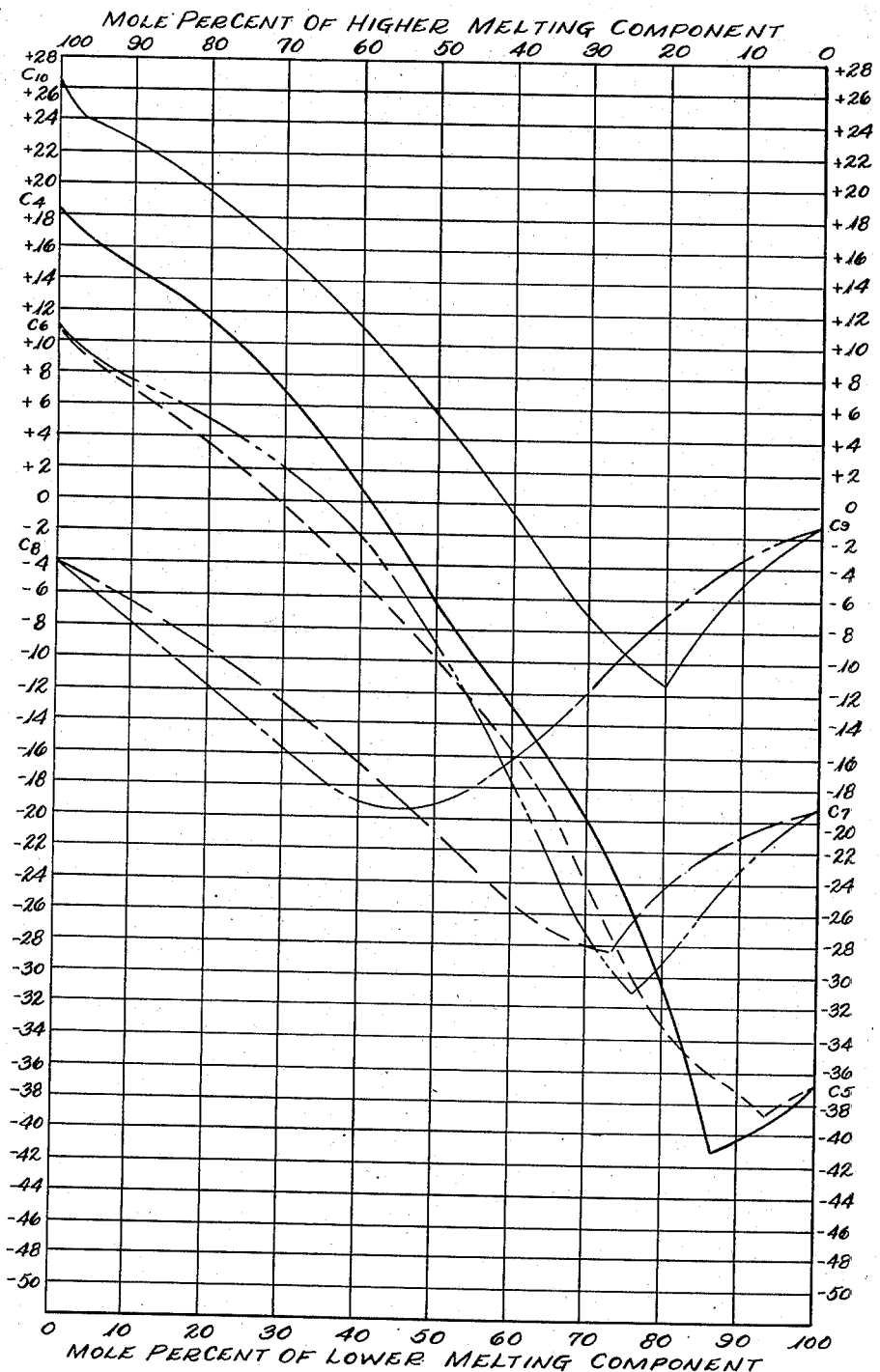
Fig. 4 shows the solidification points of the binary mixtures of adjacent members of the homologous series of dimethyl esters of dicarboxylic acids from the succinate through the sebacate.

The solidification-point curve of Fig. 2 was prepared from determinations of the solidification points of a number of binary mixtures containing different percentages of pure dimethyl succinate and pure dimethyl glutarate. Curves were similarly prepared for the entire series of binary mixtures of adjacent esters from dimethyl succinate to dimethyl sebacate, and these are shown in Fig. 4. The suberate-azelate curve is quite different from the others, so it is separately shown in Fig. 3. The oxalate and malonate curves are not shown in Fig. 4, but they are similar to the others. The melting point of dimethyl malonate is $-62°$ C. The melting point of dimethyl oxalate is $54°$ C. The malonate-succinate and the oxalate-malonate eutectic mixtures both contain a low percentage of the malonate and solidify below $-62°$ C.

In separating a mixture of acids, the mixture is first esterified with a lower boiling alcohol. For instance, the mixture may be refluxed with methanol and any esterification catalyst such as sulfuric acid, etc. Other lower boiling alcohols might be used up to around butyl, but the methyl esters have the lowest boiling points and are preferred. After the esterification, the excess alcohol will be distilled off and the catalyst neutralized or otherwise rendered inactive.

The mixture of esters is then distilled. Figure 1 shows two distillation curves, one in full lines and one in dotted lines. In full lines is the curve obtained on distillation of a mixture of dicarboxylic acids obtained by oxidation of fatty acids in an Oldershaw 50-plate, 1-inch column at 50 mm. Considerable percentages of the several components, each of high purity, were obtained at the several plateaus. However, even using such expensive distillation equipment, considerable of the product was recovered as binary mixtures. For instance, although the amount of very pure succinic acid approached 100 milliliters, and there was more than 100 milliliters of glutaric acid, the shoulder material composed of a binary mixture of the two amounted to over 80 milliliters.

The binary mixture recovered in the distillation of a simple two-component system does not pose a real problem because it may be redistilled with the next charge. If only one component (the lower boiling) of this system is desired, the binary mixture remaining after distillation of a very pure fraction of the desired component may even be left in the distillation pot until the next run. Also, continuous distillation systems lend themselves admirably to distillation of simple binary mixtures. However, in the fractionation of a multi-component mixture, the shoulders constitute a real problem. They cannot economically be returned to the distilling pot because of the sheer volume of the shoulders obtained and because of the cost of redistilling the once-distilled material, and the loss on each such distillation. Also, it is uneconomical in terms of equipment, time and space to store shoulder amounts of several binary mixtures until sufficient is accumulated to justify redistillation.

According to this invention, a high percentage of the higher melting component of such binary or shoulder mixtures is recovered in a high state of purity without redistillation. The crystallization fractions may be combined with the distillation fractions of high purity producing products of high purity, the purity of each being, for example, at least 95 percent.

Also, it is not necessary to use expensive distillation equipment and first recover fractions of high purity, represented by the various plateaus shown in the full-line curve. An ordinary distillation column may be used, and the distillation curve may be more nearly like that represented by the dot-dash curve of Fig. 1. Then the fractions will be cut at the temperatures of the respective plateaus without separating any fractions of high purity, and all of the material of high purity will be obtained by crystallization of the fractions which are essentially binary mixtures. Thus, the material collected between the $C_4$ and $C_5$ plateaus is essentially a binary mixture of succinic and glutaric acid esters, and the other fractions will be essentially binary mixtures of glutaric and adipic acid esters, adipic and pimelic acid esters, etc.

For convenience we list here the boiling points (subscripts refer to absolute pressures in millimeters of mercury) and the solidification points of the dimethyl esters of the lower straight-chain dicarboxylic (alpha, omega-alkanedioic) acids:

|  | B. P. | S. P., °C. |
|---|---|---|
| Oxalate | $163.3_{760}$ | +54 |
| Malonate | $181.7_{760}$ | −62 |
| Succinate | $114._{52}$ | +18.1 |
| Glutarate | $129._{52}$ | −37.0 |
| Adipate | $144._{52}$ | 10.45 |
| Pimelate | $158._{53}$ | −18.5 |
| Suberate | $171._{50}$ | −3.9 |
| Azelate | $184._{50}$ | −1.2 |
| Sebacate | $196._{50}$ | 26.3 |

Although the boiling points increase with increase in molecular weight of the acids (see Fig. 1), the melting points of adjacent homologs are alternately higher and lower than this, coupled with the fact that the eutectic mixtures contain only a small amount of one of the two esters, makes the combined process of distillation and crystallization feasible and efficient for the separation of the various straight-chain dicarboxylic acid esters.

The distillation of the esters which is dependent on the boiling points, has been discussed in connection with Fig. 1. The crystallization of the binary distillate fractions will be discussed with reference to the other figures. Figure 2 is typical of the solidification point curves of the binary mixtures, combined in Fig. 4 (except for the suberate-azelate curves shown in Fig. 3). Figure 2 refers to a binary mixture of dimethyl succinate and dimethyl glutarate. The solidification point of the former is 18.1°, and the solidification point of the latter is −37° C. The solidification point of the eutectic mixture (dimethyl succinate-dimethyl glutarate) is −41.2° C. It is important to note that this eutectic comprises 86.9 mole percent of the lower melting dimethyl glutarate and only 13.1 mole percent of the higher melting dimethyl succinate. It is because of this that on crystallization, a high yield of the dimethyl succinate will crystallize out in substantially pure condition, leaving only a relatively small amount of the eutectic mixture. Figure 3 illustrates that in all of the eutectics (with the exception of the suberate-azelate), only a small mole percent of the lower melting compound is present. This means that in cooling any of these binary mixtures (and it is also true of the binary mixtures of the oxalate-malonate, and the malonate-succinate) the higher melting component crystallizes out in a substantially pure state until there is only a small amount of it left in the solution. Thus, in cooling any mixture of dimethyl succinate and dimethyl glutarate, the succinate will crystallize out in a substantially pure condition until the temperature of the mixture is cooled to −41.5° C. and then there is only 13.1 mole percent of the succinate present for each 86.9 mole of the glutarate present. This of course assumes that at the start of the cooling operation there is more of the higher melting component present in the mixture than is present in the eutectic, and this is true of the binary mixtures obtained by the distillation of mixtures of dicarboxylate esters obtained from the dicarboxylic acids produced by oxidations such as mentioned above.

The operation of the process will be further described in connection with the mixtures of acids which on esterification produced the curve shown in full lines in Fig. 1. The mixture of dicarboxylic acids was esterified with methanol and 840 parts by volume of the ester were obtained. The ultimate analysis follows:

|  | Parts |
|---|---|
| Lights | 20 |
| Dimethyl succinate | 140 |
| Dimethyl glutarate | 180 |
| Dimethyl adipate | 148 |
| Dimethyl pimelate | 172 |
| Dimethyl suberate | 72 |
| Dimethyl azelate | 68 |
| Dimethyl sebacate | 40 |

On distillation pure fractions were obtained at the plateaus, and in the following table these various fractions are identified by the number of carbons in the pure acids collected, as, for example, by using $C_4$ to represent succinate. The analysis of these pure fractions is given below together with the analysis of the shoulder materials. The pure fractions are identified on the curve and in the table by the number of carbon acids in the acids from which the esters were produced, and the shoulder fractions are represented by A, B, C, etc.

| Sample | Purity in Mol Percent |
|---|---|
| $C_4$ | 96 succinate. 2 glutarate. 1 adipate. 1 miscellaneous. |
| A | 60 succinate. 37 glutarate. 2 adipate. 1 miscellaneous. |
| $C_5$ | 97 glutarate. 2 succinate. 1 adipate. |
| B | 42 glutarate. 56 adipate. 1 succinate. 1 pimelate. |
| $C_6$ | 97 adipate. 1 glutarate. 1 succinate. 1 pimelate. |
| C | 50 adipate. 49 pimelate. 1 glutarate. |
| $C_7$ | 99 pimelate. 0.5 adipate. 0.5 glutarate. |
| D | 49 pimelate. 48 suberate. 1 adipate. 2 miscellaneous. |
| $C_8$ | 97 suberate. 2 pimelate. 1 miscellaneous. |
| E | 48 suberate. 48 azelate. 2 pimelate. 2 miscellaneous. |
| $C_9$ | 96 azelate. 2 suberate. 2 sebacate. |
| F | 40 azelate. 57 sebacate. 3 miscellaneous. |

The pure distillates all had a purity of 96 percent or better. The shoulder fractions each had substantial amounts of two different components with an inconsequential amount of other material. Thus, shoulder material A had 60 parts of dimethyl succinate and 37 parts of dimethyl glutarate together with a small amount of adipate and miscellaneous material. Referring to Fig. 4, we see that the succinate has a solidification point of about 18° C. and the glutarate a solidification point of about −36° C. On cooling fraction A, Figs. 2 and 4 show that because it contained 60 parts of succinate it will become saturated at about zero. On cooling to a lower temperature, the succinate will separate, and only succinate will separate until the temperature reaches the solidification point of the eutectic mixture, which is just below 40° below zero. Actually the mixture should not be cooled to the solidification temperature of the eutectic mixture, but to a temperature just above, such as −38. The eutectic, according to these figures, is composed of about 86 mole percent of glutarate and 14 mole percent of succinate. Assume that at the temperature just above the eutectic to which the mixture is to be cooled, the mixture contains 85 mole percent of glutarate and 15 mole percent of succinate. We have pointed out that on cooling to any temperature above the solidification point of the eutectic the succinate crystallizes out in an almost pure condition. All of the glutarate remains in solution. Thus, the 37 parts of glutarate in the original material represents the 85 mole percent of glutarate present at the minimum temperature to which the mixture is cooled (a temperature just above the solidification point of the eutectic mixture). At this lower temperature, at which the ratio is 85 mole percent of glutarate and 15 mole percent of succinate, there will be only about 6.5 parts of succinate left in the solution. (This figure of 6.5 is obtained by solving the equation $$85:15=15:X)$$

At the minimum temperature there will be the original 37 parts of glutarate still in solution, with only 6.5 parts of succinate. Fifty-three and one-half parts (60 parts minus 6.5 parts) of succinate will have crystallized out. This is most of the succinate present in the original binary mixture obtained as a distillate fraction. This is pure succinate and can be added to the pure distillate fraction, or be used in any desired manner. An examination of Fig. 1 shows that the plateau C is a straight line over about 80 volumes. Add to this the pure succinate recovered by crystallization, and we have a very substantial yield of pure succinate with only one distillation. The mother liquor which contains 6.5 parts of succinate can be treated as desired.

Fraction B contains essentially 42 parts of glutarate and 56 parts of adipate. Figure 4 shows that the adipate solidifies at about 11° C., and the glutarate at about −37° C. When this mixture B is cooled, adipate will crystallize out in very pure form to a temperature just above the solidification point of the eutectic which is about −38.5° C. For simplicity, assume that the binary mixture is cooled to −35°, at which temperature it will contain 90 mole percent of glutarate and only 10 mole percent of adipate. At this minimum temperature the 42 parts of glutarate in the original mixture remains in solution, and constitutes the 90 mole percent which is present in the eutectic mixture at −37° C. At this minimum temperature of −37° only 4.7 parts of the adipate will remain in solution. The other 51.3 parts crystallizes out of solution as pure adipate. It may be added to the distillate fraction or used in any desired way.

Fraction C contains 50 volumes of dimethyl adipate and 49 volumes of dimethyl pimelate. The eutectic point on the curve in Fig. 4 is at −31° C. Assume that the mixture is cooled only to −27°, at which it will contain about 70 mole percent of pimelate and only 30 mole perment of adipate. On cooling to −27°, the adipate content of the solution will be reduced to 21 parts, and 29 parts of adipate will be crystallized out. The 21 parts remaining in solution represents 30 mole percent of the solution content, whereas the 49 parts of pimelate, the entire original amount, represents 70 mole percent of the material in solution.

Note from Fig. 4 that the even-numbered carbons are at the left margin and the odd-numbered carbons are at the right margin. This means that the solidification points of the esters of acids containing the even-numbered carbons are higher than the solidification points of the adjacent homologs of odd-numbered carbons. In this system, operating at the left of the eutectic, in any crystallization the ester of the even-numbered acid will crystallize out regardless of whether the binary mixture contains the adjacent higher or adjacent lower homolog ester. Thus on cooling both solutions B and C, adipate crystallizes out. Fifty-one and three-tenths mole percent of adipate crystallizes out of fraction B, and 29 mole percent of adipate crystallizes out of fraction C. This, added to the pure distillate of some 60 volumes represented by the plateau in Fig. 1, gives a high yield of very pure adipate recovered by the one distillation and the two crystallizations.

Similarly, suberate is crystallized from fraction D. If the fraction is cooled to —27° C., the liquid analyzes 65 parts of pimelate and 35 parts of suberate. On cooling to this temperature twenty-two parts of the suberate crystallizes, and the remaining 26 parts remains in solution. This represents 35 mole percent as contrasted with 65 mole percent or 59 parts of pimelate.

On cooling fraction E, it would be difficult to separate any pure suberate or azelate, because the particular fraction under consideration contains equal amounts of the two esters. If one were present in a predominating amount it would be possible to obtain at least a portion of it in pure form. This is done by separating the shoulder material into two distillate fractions; one fraction containing about 75 percent suberate, and the other about 75 percent azelate. On cooling, pure suberate and pure azelate will separate from the respective fractions, as the case may be, until the eutectic mixture composition is reached in each crysallization. A substantial yield of both esters is thus obtained.

Fraction F contains azelate and sebacate. The eutectic mixture crystallizes out at —10° C. and this contains 80 mole percent of azelate and 20 mole percent of the sebacate. Thus, 37 parts of the sebecate will have crystallized out before this temperature has been reached. This sebacate is substantially pure and may be disposed of or utilized as pure material.

Thus, except for fraction E, the various distillate fractions which are binary mixtures, may be cooled to a temperature just above the temperature of the eutectic mixture to crystallize out ester of the acid containing an even number of carbon atoms in substantially pure form. In the eutectic mixture there will be a high percentage of the acid comprising an odd number of acids, namely, better than 60 mole percent, and possibly as much as 90 mole percent. These binary mixtures composed of a high percentage of the acids containing an odd number of carbon atoms may be utilized as such, or treated as desired for separation into their component parts. Indeed, such eutectic mixtures, by their very nature, are ideally suited for the formation of low temperature plasticizers by esterification with higher alcohols since such mixtures give much better low temperature properties than either pure ester alone. Such low temperature plasticizers are much in demand by the military in arctic climates. If, instead of collecting a single distillate fraction E, two fractions are collected, the ester containing an even number of carbon atoms (the suberate) will be crystallized from only one of these fractions; the ester containing an odd number of carbon atoms (the azelate) separates from the other on cooling.

The mixtures subjected to crystallization may contain other components, as, for example, solvents. Only those solvents can be used which freeze substantially below the freezing points or solidification points of the esters which are crystallized out. For instance, benzene which tends to solidify at 5.5° C. can not be used to crystallize out dimethyl adipate from a mixture of either dimethyl adipate-dimethyl glutarate or dimethyl adipate-dimethyl pimelate, because the glutarate and pimelate melt below 5.5° C.

The following examples illustrate the use of solvent in the separation of the two components of binary mixtures such as those obtained as shoulder fractions in the separation of acid mixtures.

*Example I*

A succinate-glutarate shoulder fraction from the rapid distillation of a mixture of dimethyl esters of dicarboxylic acids which esters contain 6 to 12 carbon atoms had a solidification point of —4° C. This indicated a purity of 54 mole percent in dimethyl succinate. Analysis showed this mixture to contain the following mole percentages of materials:

| | |
|---|---|
| Dimethyl succinate | 54.0 |
| Dimethyl glutarate | 42.0 |
| Dimethyl adipate | 2.0 |
| Dimethyl pimelate | 0.5 |
| Dimethyl suberate | 0.5 |
| Dimethyl sebacate | |
| Dimethyl azelate | |
| Methyl esters of monocarboxylic acids, as methyl pelargonate | 1.0 |
| Miscellaneous | |
| Total | 100.0 |

This mixture was cooled in three different ways, as described below in paragraphs A, B and C. Although procedure A gave a substantial yield, higher yields were obtained by the other procedures.

(A) The mixture was cooled rapidly without stirring to —30° C. Crystals separated, and the mother liquor was allowed to drain from them. The crystals were analyzed by the solidification-point method, using the curve of Fig. 2, and the melting point of 10° C. indicated a purity of only 78 mole percent. Recrystallization at 4° C. gave a product which was 93 percent pure. Only 50 percent yield was actually obtained, although the theoretical yield of such a mixture containing 54 mole percent of succinate is 36 mole percent, or 67 percent of the amount present.

(B) The above starting mixture was remelted and cooled slowly with stirring to —30° C. The rate of cooling was about 2 degrees per hour. This gave large, hard crystals which drained easily of entraining mother liquor. Such crystals were analyzed by the solidification-point method, using the curve of Fig. 2. The mother liquor was also analyzed. The following table shows the results of these analyses. "Weight $C_4$" refers to the weight in pounds, grams, or whatever unit may be employed.

| | Starting Material | Crystals | Filtrate |
|---|---|---|---|
| Solidification point, ° C | —3 | 15 | —30 |
| Mole percent $C_4$ | 54 | 94 | 17.7 |
| Mole percent $C_5$ impurity | 46 | 6 | 82.3 |
| Weight percent | 100.0 | 46.3 | 53.7 |
| Weight $C_4$ | 49 | 43.5 | 9.5 |
| $C_4$ percent of theory | | 97.6 | |

Referring to the table we find that under the heading Starting Material we obtain a solidification point of —3.0° C. By consulting the curve shown in Fig. 2 we find that this contains 54 mole percent of dimethyl succinate and that we should refrigerate to some point above —37° C. in order to avoid contamination by the eutectic mixture. In this example the maximum yield was not attained because the liquid was only cooled to —30° C. The mole percent $C_5$ impurity includes the other impurities such as the dimethyl adipate and the other components. The total weight present is, of course, 100 percent. The weight of succinate ester is based on its molecular weight as compared to the molecular weight of the glutarate ester.

Under the column headed Crystals we have the data obtained on the crystals resulting from cooling the mixture to −30° C. This showed a solidification point of 15° C. which Fig. 2 shows as being 94 mole percent pure. The mole percent impurity is therefore 100−94 or 6 mole percent. The weight obtained was 46.3 percent of the starting weight of which 94 percent is the dimethyl succinate and therefore contains 43.5 parts of dimethyl succinate.

Under the column headed Filtrate we have the liquid obtained on filtration. The solidification point was found to be −30° C. This shows that it contains 17.7 mole percent of succinate ester and conversely 82.3 percent as glutarate ester. If the glutarate is calculated on a weight basis it would calculate as 90 percent dimethyl glutarate. Thus, it was possible, by one crystallization to obtain two separate fractions, each having a purity of at least 90 percent by weight. Such efficient fractionation of materials which are so similar in properties is unknown in the prior art.

(C) In the third crystallization the same starting material was used, but to it was added just sufficient petroleum ether (B. P. 35–60° C.) to dissolve in the mixture at room temperature. Too much petroleum ether forms two layers. About 25 parts by volume of this petroleum ether dissolves in 100 parts of dimethyl succinate. Upon cooling such a solution of the dimethyl esters in the petroleum ether, very hard regularly formed crystals layered out in a terrace-like structure. The mother liquor from this (which comprised two liquid layers) was easily separated from the crystals. The crystals were washed with a displacement wash of petroleum ether, and the solidification-point was determined as 18.0°. This indicated a purity of 97.7 mole percent. This substantially pure dimethyl succinate was obtained directly, i. e., without recrystallization.

The above examples show three different ways of accomplishing the crystallization. In method I-A it was shown that rapid cooling was not conducive to higher purity owing, no doubt, to the poor crystal formation and probable occlusion of impurities. In method B was shown the advantage obtained by slow cooling with slow agitation. In method C was shown how a solvent could be used to advantage. Cooling need not be so slow and stirring is not necessary, but both are desirable and add to the purity of the product.

*Example II*

A binary shoulder fraction of dimethyl esters was distilled from a multi-component mixture of dimethyl esters of straight-chain dicarboxylic acids containing known and unknown impurities. The mixture was distilled in a laboratory column having a low efficiency of separation. It had the following analysis:

|  | Percent |
|---|---|
| Dimethyl azelate | 31.6 |
| Dimethyl sebacate | 66.4 |
| Miscellaneous | 2.0 |

The shoulder fraction was cooled slowly to −5.0° C. and then very slowly to −6.0° C. It was kept at this temperature 16 hours and then filtered and washed with petroleum ether (B. P. 35°–60° C.) at −10° C. The dimethyl sebacate crystallized in long, thick needles and was easy to wash free of adhering liquor. The following table shows the results of this crystallization. The mole percent content and weight were determined by the solidification point method illustrated by the curves of Fig. 4. The dimethyl azelate was regarded as an impurity and is so reported.

|  | Starting Material | Crystals | Filtrate |
|---|---|---|---|
| Solidification point, ° C | 14.0 | 24.0 | −11.2 |
| Mole percent $C_{10}$ | 66.4 | 96.0 | 24.0 |
| Mole percent impurities | 34.6 | 4.0 | 76.0 |
| Weight percent | 100.0 | 53.0 | 47.0 |
| Weight $C_{10}$, lbs. or grams | 66.4 | 50.8 | 11.3 |
| $C_{10}$ (Percent of theory) | | 108.0 | |

Although the product obtained by the first crystallization is sufficiently pure for most purposes, it was remelted and cooled slowly to +4° C. overnight. The resulting crystals had a solidification point of 26.2° C., showing a purity of 99.8 mole percent. The yield was 91 percent. A purity of 99.8 percent would be almost impossible to attain by means of a commercial fractionating column itself and, in addition, would require an inordinately long time owing to the large reflux ratios required.

The table below shows the number of actual plates required in a fractional distilling tower to obtain products of various purities when fractionating an essentially equimolar mixture of dimethyl sebacate-dimethyl azelate containing about 33 mole percent of higher boiling impurities including dimethyl undecanoate. Such fractionation to be carried out at 50 mm. Hg absolute pressure and at a maximum reflux ratio of ten to one.

| Mole percent purity: | Theoretical plates necessary |
|---|---|
| 66.6 | 4 |
| 80.0 | 10 |
| 90.0 | 17 |
| 95.0 | 32 |
| 99.0 | 51 |
| 99.8 | 71 |

It can easily be seen, therefore, the advantage in using the precise distillation-crystallization technique to obtain products in high purity. A purity of 66.6 percent can be obtained with ordinary economical distillation equipment. The distillate can then be crystallized to obtain high purities quickly and in excellent yields without the use of an expensive distillation plant.

Thus the various binary mixtures of esters obtained as shoulder fractions and solutions thereof, are subject to separation of one of the components by crystallization, provided the two esters are not present in substantially the mole percentages in which they are present in the eutectic mixture. The component present in a mole percentage greater than that represented by the eutectic mixture is crystallized out on cooling. Because in the curve of each of the binary fractions of the adjacent ester homologs of this series (except the suberate-azelate curve), the point at which the eutectic mixture crystallizes is at the right, and perhaps the extreme right of the centerline representing a 50–50 mixture, the higher-melting point component is the one to the left of the point at which the eutectic mixture solidifies, and is the one that separates when the entire distillate between any two plateaus is taken as the shoulder fraction. By separation of one of the components by crystallization from a liquid system, as herein contemplated, the percentage content of the remaining component is increased. This component may be recovered in any one of various ways which will suggest themselves to a person skilled in the art.

Thus it is seen that because of the fact that the acids are not easily separated by distillation, and the lower esters can be separated by distillation without substantial decomposition, either with or without rectification, and the curves of the solidifying points of the binary mixtures in the shoulder fraction are as represented, with one of the melting points substantially below the other and the solidification point of the eutectic mixture near the solidification point of the component having the lower solidification point, the separation of the acid components of a starting mixture by esterification with distillation and then crystallization from a liquid system, as herein described, is quite efficient for the recovery of fractions of high purity, and particularly for esters of acids having an even number of carbon atoms.

Although the description relates more particularly to the preparation and treatment of the dimethyl esters, and the claims refer to the dimethyl esters, it is to be understood that the di-esters of the lower straight-chain alcohols are the substantial equivalents thereof.

What I claim is:

1. The process of obtaining an alpha, omega-alkanedioic acid ester of high purity from a mixture containing adjacent homologs of such acids each containing 2 to 10 carbon atoms, which process comprises esterifying the mixture with methanol, distilling the resulting diesters and collecting a fraction which is essentially a binary mixture of two adjacent ester homologs, and then crystallizing one of the two ester homologs from a liquid system containing this binary mixture by cooling the system to a temperature just above the temperature at which a eutectic mixture of the two ester homologs crystallizes from the system, and thereby obtaining one of the esters.

2. The process of obtaining an alpha, omega-alkandioic acid ester of high purity from a mixture containing adjacent homologs of such acids each containing 2 to 10 carbon atoms, which process comprises esterifying the mixture with methanol, distilling the resulting diesters and collecting a fraction which is essentially a binary mixture of two adjacent ester homologs, dissolving a solvent into the mixture and then crystallizing one of the two ester homologs from the resulting system by cooling the system to a temperature just above the temperature at which a eutectic mixture of the two ester homologs crystallizes in such solvent and thereby obtaining one of the esters in a substantially pure condition.

3. The process of separating adjacent alpha, omega-alkanedioic acids each containing 2 to 10 carbon atoms from a mixture of more than two adjacent homologs of such acids and obtaining esters of the homologs, which process comprises esterifying the acids in the mixture with methanol and obtaining a mixture of the dimethyl esters of the homologs, distilling the resulting mixture and obtaining fractions which are essentially binary mixtures of adjacent ester homologs, and then crystallizing one of the two ester homologs from each of several liquid systems each containing one of the binary mixtures by cooling the respective systems to a temperature just above the temperature at which a eutectic mixture of the said two ester homologs therein crystallizes therefrom and thereby obtaining an ester homolog from each of a plurality of the liquid systems.

4. The process of obtaining dimethyl succinate from a mixture of at least three adjacent straight-chain dicarboxylic acid homologs including succinic and glutaric acids which comprises esterifying the mixture with methanol and producing dimethyl esters, distilling the mixed esters and separating as a distillate fraction a mixture composed essentially of dimethyl succinate and dimethyl glutarate in which there is appreciably more dimethyl succinate than in the eutectic mixture of the two, and cooling the mixture to a temperature not greatly above the solidification point of the eutectic mixture of the two and thereby crystallizing substantially pure dimethyl succinate from the mixture.

5. The process of obtaining dimethyl adipate from a mixture of at least three adjacent straight-chain dicarboxylic acid homologs including glutaric and adipic acids which comprises esterifying the mixture with methanol and producing dimethyl esters, distilling the mixed esters and separating as a distillate fraction a mixture composed essentially of dimethyl glutarate and dimethyl adipate in which there is appreciably more dimethyl adipate than in the eutectic mixture of the two, and cooling the mixture to a temperature not greatly above the solidification point of the eutectic mixture of the two and thereby crystallizing substantially pure dimethyl adipate from the mixture.

6. The process of obtaining dimethyl adipate from a mixture of at least three adjacent straight-chain dicarboxylic acid homologs including adipic and pimelic acids which comprises esterifying the mixture with methanol and producing dimethyl esters, distilling the mixed esters and separating as a distillate fraction a mixture composed essentially of dimethyl adipate and dimethyl pimelate in which there is appreciably more dimethyl adipate than in the eutectic mixture of the two, and cooling the mixture to a temperature not greatly above the solidification point of the eutectic mixture of the two and thereby crystallizing substantially pure dimethyl adipate from the mixture.

7. The process of obtaining dimethyl suberate from a mixture of at least three adjacent straight-chain dicarboxylic acid homologs including pimelic and suberic acids which comprises esterifying the mixture with methanol and producing dimethyl esters, distilling the mixed esters and separating as a distillate fraction a mixture composed essentially of dimethyl pimelate and dimethyl suberate in which there is appreciably more dimethyl suberate than in the eutectic mixture of the two, and cooling the mixture to a temperature not greatly above the solidification point of the eutectic mixture of the two and thereby crystallizing substantially pure dimethyl suberate from the mixture.

8. The process of obtaining dimethyl sebacate from a mixture of at least three adjacent straight-chain dicarboxylic acid homologs including azelaic and sebacic acids which comprises esterifying the mixture with methanol and producing dimethyl esters, distilling the mixed esters and separating as a distillate fraction a mixture composed essentially of dimethyl azelate and dimethyl sebacate in which there is appreciably more dimethyl sebacate than in the eutectic mixture of the two, and cooling the mixture to a temperature not greatly above the solidification point of the eutectic mixture of the two and thereby crystallizing substantially pure dimethyl sebacate from the mixture.

References Cited in the file of this patent

UNITED STATES PATENTS

| 2,269,998 | Czerwin | Jan. 13, 1942 |
| 2,560,156 | Cavanaugh et al. | July 10, 1951 |

OTHER REFERENCES

Gilman et al.: "Organic Syntheses," Coll. vol. 1 (1932), pp. 18 to 20.

Rodd: "Chemistry of Carbon Compounds," vol. 1, part B (1952), pp. 954 and 984–5.